May 28, 1935.   W. G. WILSON   2,002,760
FLUID TRANSMISSION OF POWER
Filed June 11, 1934   5 Sheets-Sheet 1

W. Wilson
INVENTOR

May 28, 1935. W. G. WILSON 2,002,760
FLUID TRANSMISSION OF POWER
Filed June 11, 1934 5 Sheets-Sheet 2.

W. Wilson
INVENTOR
By Marks & Clerk
ATTYS.

May 28, 1935.  W. G. WILSON  2,002,760
FLUID TRANSMISSION OF POWER
Filed June 11, 1934    5 Sheets-Sheet 4

W. Wilson
INVENTOR

By: Marks & Clerk
ATTYS.

May 28, 1935. W. G. WILSON 2,002,760
FLUID TRANSMISSION OF POWER
Filed June 11, 1934 5 Sheets-Sheet 5

Patented May 28, 1935

2,002,760

UNITED STATES PATENT OFFICE 2,002,760

FLUID TRANSMISSION OF POWER

Walter Gordon Wilson, Martyr Worthy, Winchester, England

Application June 11, 1934, Serial No. 730,162
In Great Britain December 14, 1932

22 Claims. (Cl. 60—54)

This invention relates to power transmission systems of the type in which momentum is imparted to a fluid (which description includes liquids, gases and vapours) which thereafter impinges upon a driven member and imparts momentum to it.

In power transmission systems of the said type it is often advantageous to cause the fluid to rotate or to vary or reverse its rotation at some place in its path.

The object of this invention is to provide a suitable mechanism to control the rotation of the fluid by impressing upon it a rotation while causing as little eddy as possible.

More particularly this invention relates to power transmission systems of the said type of the kind in which the fluid is driven by a rotating driving member in a closed circuit to a driven member to which it imparts rotation and back to the driving member again, and in which the momentum imparted to the fluid by the driving member is partly angular, i. e. rotational, and partly perpendicular to the plane of rotation of the driving member, i. e. longitudinal.

In a power transmission system of the said kind I have found that it is advantageous to place in the path of the fluid after it has left the driven member a member (hereinafter called a "reaction member") which acts so as to impart rotation to the fluid coming from the driven member in the same direction of rotation as that of the driving member.

Two advantages result from this interposition of the reaction member:—

(1) the fluid is supplied to the driving member with a rotation nearer to that of the driving member, thus diminishing the amount of eddy formed when the fluid impinges upon the driving member;

(2) the fluid is given an additional angular momentum which, being added to that which would in any case be imparted to the fluid by the driving member, results in more torque being transmitted by the fluid to the driven member.

Now when the fluid is rotated or its rotation varied or reversed by the reaction member it is desirable that eddies in the fluid should not thereby be produced or else the efficiency of the system will be impaired. Thus the reaction member should be of such a kind as to impress the rotation upon the fluid with the minimum amount of eddy. The reaction member should also be of such a kind as not to offer more resistance to the passage of the fluid than is necessary for impressing the rotation. Further, the reaction member should as far as possible fulfil these conditions of working over the whole range of rotational and longitudinal speeds which the fluid upon which it acts will have during the operation of the said power system.

The problem to be solved therefore with regard to the reaction member is to provide a mechanism for controlling the rotation of the fluid of such a kind as to impress the rotation upon the fluid with the minimum resistance to the passage of the fluid and the minimum amount of eddy to the fluid, and as far as possible over the whole range of rotational and longitudinal speeds which the fluid acted upon will have during the working of the said power transmission system.

A particular object of this invention is to provide such a mechanism.

This invention consists in a mechanism for controlling the rotation of the fluid in a power transmission system of the said type by the immersion in the path of the fluid of at least two sets of vanes of such a kind and connected together in such a manner that the movement of the fluid past the said sets of vanes causes them to be relatively rotated with respect to one another so as to impress a rotation upon the fluid.

The expression "set of vanes" is meant to include any means consisting of a member or any rigidly interconnected members of such a kind that there are passages or a passage through the means along which the fluid can pass in a direction with a longitudinal component, the said passages or passage being of a substantial length such that upon the means being rotated the fluid impinging upon it will be caused to rotate or have its rotation varied or reversed.

By the expression "relatively rotated" I mean that one set of vanes will rotate at a different rotational velocity or in an opposite direction to the other set of vanes.

It will be understood that the rotation of each set of vanes must always be about some axis not being perpendicular to the direction of longitudinal flow of the fluid past the said set and will preferably be about an axis parallel to the said direction.

It must further be understood that it is an essential part of the invention that the movement of the fluid past the said sets of vanes should cause them to be relatively rotated with respect to one another. It is therefore necessary that the sets of vanes shall be of such a kind that the movement of the fluid shall relatively rotate them.

By the expression "so as to impress a rotation upon the fluid" is meant "so as to give to the fluid an angular momentum, or to vary or reverse the angular momentum, if any, possessed by the fluid before it is controlled".

It is preferable to use the said mechanism for controlling the rotation of the fluid with the said two sets connected together through means carried upon a member integral with a third set of vanes immersed in the path of the liquid between the said two sets, the three sets of vanes being so connected together and of such a kind that the movement of the fluid past them causes them to be progressively and relatively rotated with respect to one another.

By the expression "progressively and relatively rotated" is meant that the sets of vanes should be so rotated that, considering one direction of rotation as being of positive sign and the opposite direction as being of negative sign, and considering the sets in order from one end to the other end, there will be a difference in rotation between any set and its succeeding set and such difference will always be of the same sign. Thus if the inner set is held stationary and the preceding set is rotating positively, the succeeding set will be rotating negatively.

It will be appreciated that where there are more than two sets of vanes the sets of vanes must be of such a kind that the movement of the fluid causes them to be progressively and relatively rotated with respect to one another.

The invention will now be described with reference to the accompanying drawings.

Figure 1:
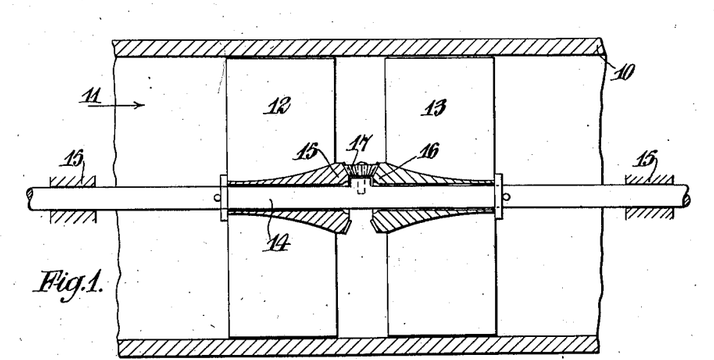
Figure 1 is a sectional elevation of a particular mechanism constructed according to the invention and arranged in a tube.

Referring now to Figure 1, 10 is a tube through which a fluid moves with a velocity having a longitudinal component in the direction of the arrow 11. Immersed therein in the path of the fluid are two sets of vanes 12 and 13 mounted rotatably side by side upon a shaft 14 supported centrally in the tube 10 by suitable bearings 15, the shaft being held stationary by means not shown. The two sets of vanes 12 and 13 have rigid therewith respectively bevel wheels 15 and 16 facing one another, and being geared to one or more pinions 17 situated between the said bevel wheels and being mounted upon pins 17$^a$ rigidly carried by the shaft 14. It will be seen that the two sets of vanes 12 and 13 are connected together in such a manner that if one set is rotated in one direction the other set will be caused thereby to rotate in the opposite direction.

Suppose that it is desired to impress upon the fluid passing along the tube 10 a rotation in a direction which we will call positive. Then the sets of vanes 12 and 13 must be of such a kind that the movement of the fluid past the said sets causes the set of vanes 12 to be rotated in the opposite direction to positive (i. e. negative), and the set of vanes 13 to be rotated in the positive direction.

For the rotation of the set 12 by the fluid in a negative direction will result in the fluid being deflected thereby and having impressed thereon a rotation in the positive direction given to it by the rotation of the set 13 in a positive direction.

Now at any particular instant there are three possible kinds of flow which the fluid might have when it impinges upon the set of vanes 12, that is (a) a longitudinal flow combined with a negative rotation, (b) a longitudinal flow with no rotation at all, (c) a longitudinal flow combined with a positive rotation.

Figure 2:
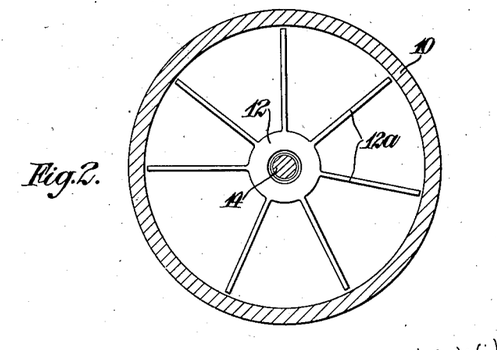
Figure 2 is a section of the said tube at right angles to Figure 1.
Figure 4:
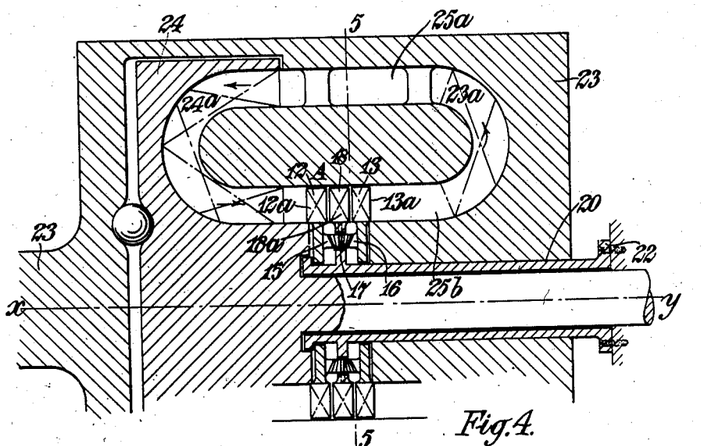
Figure 4 is a longitudinal sectional elevation of a torque converter showing a group of three sets of vanes immersed in a part of the fluid circuit.
Figure 10:
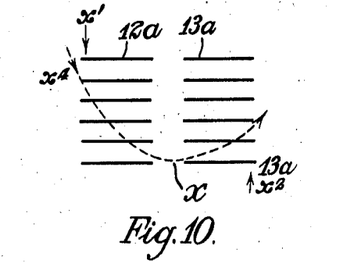
Figures 10 to 12 are developed diagrammatic views of the vanes illustrating their manner of operation.
Figure 11:
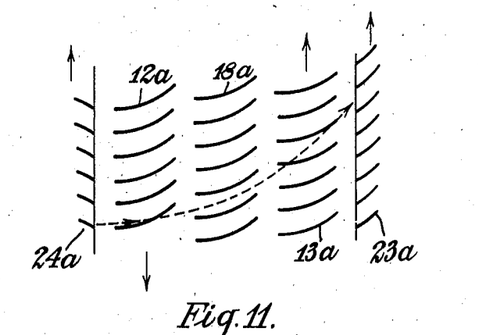
Figure 12:
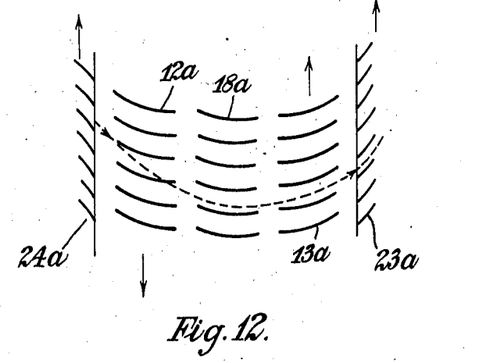

This may be appreciated more easily from Figures 10, 11 and 12 which are developed sections at right angles to that of Figure 2, Figure 10 corresponding to Figure 1, and Figures 11 and 12 corresponding to Figure 4. In these figures positive rotational velocity is measured upwards in the plane of the paper, and negative rotational velocity downwards. The thick arrows $x^1$, $x^2$ indicate the directions of rotation of the respective sets of vanes, while the slope of the dotted arrow-line $x^4$ shows the rotational velocity of the fluid compounded with its longitudinal velocity, the latter being assumed constant and being measured in the plane of the paper perpendicular to the direction in which rotational velocities are measured. Thus in Figure 10 the fluid is approaching the vanes 12$^a$ with a velocity as shown at $x^4$ which is partly longitudinal to the right and partly of negative rotation. On leaving the vanes 13$^a$ the fluid has the same longitudinal velocity combined with a positive rotation. Figure 11, however, shows the fluid impinging upon the vanes 12$^a$ with a longitudinal flow with no rotation at all and leaving the vanes 13$^a$ with a positive rotation.

Consider first the case where the flow is partly longitudinal and is partly of negative rotation. In this case each set of vanes may be such as are shown in Figures 2 and 10, i. e. each set consisting of a number of flat metal strips 12$^a$ and 13$^a$ disposed longitudinally and radially about the centre of the shaft 14. When the negatively rotating fluid impinges upon the vanes 12$^a$ it causes the set of vanes 12 to rotate negatively the vanes 12$^a$ having a sufficient slope, and at the same time is itself deflected thereby positively. The rotation of the set of vanes 12 negatively causes the set of vanes 13 to rotate positively with the result that the fluid is again deflected positively.

In the cases in which the flow is solely longitudinal or is longitudinal combined with a positive rotation, the vanes 12$^a$ must be given a slope in the positive direction (looking at the set of vanes along the direction of the arrow 11) to an extent such that the set of vanes 12 is rotated negatively by the movement of the fluid. In other words the vanes 12ª must be sloped to an amount greater than the slope of the impinging fluid, see for instance Figure 11.

It will be appreciated that the more the vanes are given a slope in the positive direction the greater will be the amount of rotation in the positive direction which will be impressed upon the fluid, and any desired rotation can be impressed upon the fluid by sloping the vanes to the required amount.

It is possible to design a stationary vane for any particular conditions of flow of the fluid so as to impress upon it any desired rotation without any eddies being formed and without offering any resistance to the longitudinal flow of the fluid.

It is very desirable that, whatever be the particular amount of rotation which it is desired to impress upon the fluid and whatever be the particular flow of the fluid, the mechanism used to control the rotation of the fluid should approximate in its reaction upon the fluid to that reaction which would have been exerted by the theoretically ideal stationary vane designed to impress that particular amount of rotation for that particular flow of the fluid.

Where the amount of rotation which it is desired to impress upon the fluid is not large, mechanism such as is shown in Figures 1, 2 and 10 will give satisfactory results. If it is desired to minimize any losses in efficiency due, e. g., to eddy formation at and about the point $x$, each vane should be curved to a concave curve, viewing it from its positive side, the exact curve depending upon the flow of the fluid. This will result in the change in angular momentum being more gradual at and about $x$, so that eddies will not be formed to an appreciable extent.

Also, where the impinging fluid has a large negative rotation it will be necessary, if eddies are to be avoided at the entry of the fluid to the passages between the vanes, to give the vanes 12ª such a curve in a negative direction at their ends at which the fluid enters that the entrant angle provided by the moving vanes 12ª for the impinging fluid approximates to that angle at which the fluid is flowing. Figure 12 shows the vanes 12ª sloped in such a manner.

Figure 3:
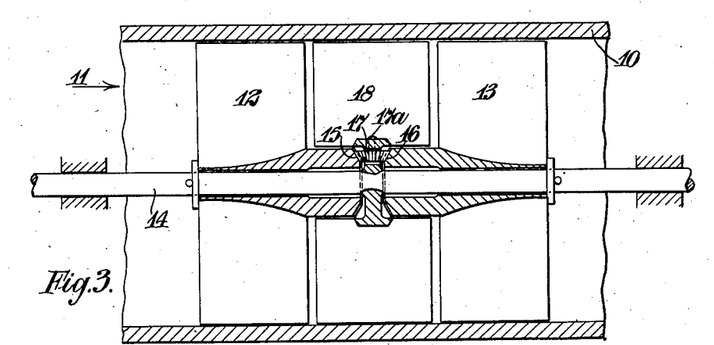
Figure 3 is a sectional elevation of another form of mechanism constructed according to the invention.

It is preferable to use the mechanism shown in Figure 3 which is similar to that shown in Figures 1 and 2 except that a central set of vanes 18 is interposed between the two sets of vanes 12 and 13, the said central set being mounted upon the pin 17ª which being carried upon the shaft 14 is held stationary with it. In this manner a third set of vanes is provided between the two outer sets of vanes 12 and 13, with what is in fact the mean of the velocities of the said two outer sets. The central set of vanes being disposed at or about the point $x$ (Figure 10) will ensure without the introduction of any further gearing that the change in angular momentum is gradual at that point so as to obviate the formation there of eddies. If it is desired still further to reduce eddy formation the vanes of each of the sets can be curved.

Up to now in the description of the invention with reference to the accompanying drawings it has been assumed that the conditions of flow along the tube 10 remain constant. It is now necessary to consider the case where the rotation of the impinging fluid varies during the period for which it is desired to control the rotation thereof.

If the rotation of the fluid impinging upon the set of vanes 12 varies the mechanism illustrated in Figure 1 will to some extent automatically adjust itself so as approximately to have the same effect upon the fluid for any particular flow thereof as if the theoretically ideal stationary vane designed for that particular flow were placed in its stead. For instance, the greater the negative rotation of the impinging fluid, the faster will the set of vanes 12 rotate in a negative direction, and this will result in (a) a greater positive rotation being impressed upon the impinging fluid, and (b) a steeper entrant angle being provided for the entry of the fluid which is necessary if the fluid is to enter without eddies being formed. Thus in the case of a power transmission system of the said type where the running conditions may vary so that the rotation of the impinging fluid changes from, for instance, no rotation at all to some maximum negative rotation, the mechanism shown in Figure 1 or 3 will prove much more efficient than any one stationary vane inserted in its stead could be, both because it minimizes eddies and impresses a greater positive rotaton as the negative rotation of the impinging fluid increases and because it offers the minimum of resistance to the longitudinal flow of the fluid.

Figures 5, 6, 8, 9:
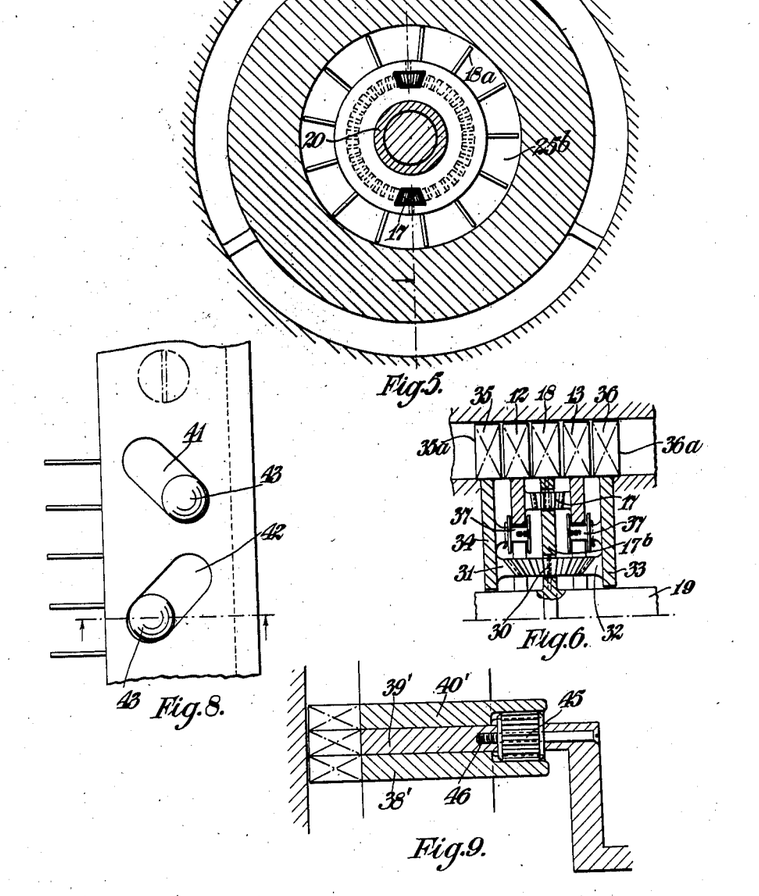
Figure 5 is a transverse section taken on the line 5—5 of Figure 4.
Figure 6 is a sectional elevation of one half of a group of five sets of vanes.
Figure 8 is a developed plan view taken on the line 8—8 of Figure 7.
Figure 9 is a modification shown in section of a particular means of mounting the sets of vanes.

Where, however, the rotation of the impinging fluid varies greatly so that sometimes the amount of rotation to be impressed upon the fluid is large (e. g. when the impinging fluid has a large negative rotation) and at other times small (e. g. when the impinging fluid has a positive rotation) it is desirable that the number of sets of vanes should be increased. It has been pointed out that a mechanism such as is illustrated in Figure 1 to some extent automatically adjusts itself for moderate variations in the flow of the impinging fluid. Where the rotation of the impinging fluid varies considerably such a mechanism has certain disadvantages. Thus it might be that with such a mechanism the vanes 12ª ought to have been curved in a negative direction if eddies were to be avoided at the entry of the fluid at its maximum negative rotation, but would be in fact sloped in a positive direction because of the fluid's maximum positive rotation. In such a case the substitution, for the set of vanes 12, of a plurality of sets of vanes of the said kind and connected together so that if an outer set be rotated the other sets will be progressively and relatively rotated, results in a great increase in efficiency. A group comprising a plurality of sets of vanes in a tube such as 10 is not illustrated, but there is illustrated in Figure 6 a plurality of sets of vanes which with certain obvious modifications could be used to control the rotation of the fluid passing along 10. Now suppose that the impinging fluid has at one time a positive rotation and at another time a negative rotation then it might be that it would be impossible with mechanism as in Figure 1 or 2 to get a sufficiently steep entrant angle for the negatively rotating impinging fluid to enter the positively sloped passages through 12 substantially eddy free. When, however, two sets of vanes, for instance, are substituted for the set of vanes 12, the outside new set of vanes will be rotated by the negatively rotating fluid faster in a negative direction than that of 12 while the inner new set of vanes will be rotated at a s'ower rotation than that of 12. Now as the outside new set of vanes is rotating faster than did 12, the entrant angle for the fluid is steeper and therefore less eddy will be produced on the entry of the impinging fluid. It will be seen that the greater the number of sets of vanes that are substituted for the set of vanes 12, the more perfectly will the mechanism automatically adjust itself so as to provide the correct entrant angle for the impinging fluid. Also the greater the number of sets of vanes the more will the reaction upon the fluid which the said sets of vanes exert thereon be automatically adjusted so as to approximate to that reaction which would be produced by the theoretically ideal stationary vane for any particular flow of the fluid. Similarly the substitution of a plurality of sets of vanes for the set of vanes 13 will have the effect of decreasing the amount of eddies formed while the fluid is subject to the reaction exerted thereon by the said latter sets of vanes. Thus the mechanism shown in Figure 6, if adapted for use in the tube 10, would result in a gain of efficiency over the whole period during which the fluid was being controlled. It will be appreciated that the vanes theoretically should be slightly curved, but the greater the number of sets of vanes used the less will be this curve. The use of a plurality of sets of vanes will therefore have this additional advantage that the vanes can be made flat with substantially no loss in efficiency.

I have described heretofore the case in which the shaft 14 is held stationary. Similar considerations apply when the shaft 14 is "held against rotation" by which expression when used herein I mean to include not only the case where the shaft is held stationary, but also the case where the shaft is held in such a manner that in order to rotate it work has to be done against a resistance which may be of any kind, for instance the force necessary to give momentum to or raise any mass. In the latter case the fluid will be controlled in a similar manner to that already described, except that the rotation impressed thereon will not be so large as if the shaft were held stationary. There is, however, this advantage that use may be made of the rotation given to the shaft 14 by the fluid to do any such work as may be desired.

If the impinging fluid is at any time strongly positive or if it is desired to impress upon the fluid a large positive rotation, it will be preferable to rotate the shaft 14 in the positive direction of rotation at a speed greater than the maximum positive rotation of the fluid. Consider the case when the shaft 14 is rotated positively and the fluid is not passing along the tube 10. In this case the pinion 17 will lock the sets of vanes 12 and 13 together, so that they both rotate in the positive direction at the same speed. Now when the fluid begins to flow along the tube 10 it will offer a resistance to the positive rotation of the set of vanes 12 which will therefore rotate negatively relatively to the rotation of the shaft 14. This relative negative rotation will cause the set of vanes 13 to rotate positively relatively to the rotation of the shaft 14. In this way, therefore, the fluid will leave the set of vanes 13 with a strong positive rotation, and a positive rotation will have been impressed thereon by the relative rotation of the vanes with respect to one another in the manner in which I have already described, in addition to that impressed consequent upon the two sets being rotated at a greater speed than the impinging fluid. It will be seen that by varying or reversing the speed of rotation of the shaft 14 any desired rotation can be impressed upon the fluid at any time, such variations preferably corresponding with the variations in rotation of the impinging fluid. Further by rotating the shaft 14 in a positive direction when the impinging fluid has a positive rotation it is possible to avoid the necessity of sloping the vanes positively and thus any resistance to longitudinal flow over the whole range of rotational and longitudinal speeds of the fluid will be substantially reduced. It must be understood that what has been said with regard to the kind of sets of vanes or the desirability of a plurality of sets of vanes applies with equal force to the case where the shaft 14 is rotated.

An application of the invention to a power transmission system of the said kind will now be described by reference to Figures 4 and 5 which show a form of torque converter.

In Figure 4, 23 is the driving member and 24 is the driven member of a torque converter which transmits the torque by means of a fluid impelled along the outer annular path 25$^a$. The whole liquid circuit is shown in the upper half of Figure 4 but only a portion of the path followed by the liquid is shown in the lower half of this figure. Integral with the driving and driven members 23 and 24 are a series of vanes indicated diagrammatically at 23$^a$ and 24$^a$ along which the fluid passes. Thus when the driving member 23 rotates the fluid is given a rotation by the vanes 23$^a$ in the same direction and is forced thereby along its outer path 25$^a$ to the driven member where it acts upon the vanes 24$^a$ and rotates the driven member in the same direction as the driving member. The fluid then returns along the inner annular path 25$^b$ back to the driving member again. In the path 25$^b$ is placed a reaction member A consisting of a group of sets of vanes similar in construction to those shown in Figure 3. The set of vanes 18 is rigid with a sleeve 20 encircling the driven shaft of the torque converter and is arranged to be held stationary by some means as shown at 22. Suppose that the driving member is rotating in a positive direction, then it is desired that the reaction member A should act so as to impart rotation to the fluid in a positive direction. Now the rotation of the fluid impinging upon the group A will depend upon the rotation of the driven member, which is rotating positively, and upon the slope of the vanes 24$^a$. It is most advantageous to slope the vanes 24$^a$ so that the fluid emerging therefrom is rotating negatively, but whether the rotation of the fluid be positive or negative the group A must be such that the movement of the fluid causes the set of vanes 12 to rotate negatively relatively to the other sets of vanes 18 and 13. From that which has already been described with reference to Figures 1, 2 and 3, it can easily be seen how best to control the rotation of the fluid by the group A for any conditions of working of the torque converter. Thus Figure 11 shows diagrammatically curved vanes 12$^a$, 18$^a$, 13$^a$ sloped for a positive rotation of the impinging fluid, while Figure 12 shows curved vanes suitable for a negatively rotating fluid.

It will be obvious that, if desired, a plurality of sets of vanes can be substituted as, for instance, shown in Figure 6.

Referring now to Figure 6, a group of sets of vanes is shown, comprising two additional sets 35 and 36 making five sets of vanes in all instead of three. In this case an additional centre pinion 30 is provided to engage an additional pair of bevel wheels 31, 32 attached to rings 33 and 34, carrying the vanes 35$^a$ and 36$^a$. These latter vanes are additional to and arranged outside of the inner vanes 12ᵃ and 13ᵃ. The sets of vanes 12 and 13 are supported by bearings 37 that are in turn carried by the rings 33 and 34. The two centre pinions 17 and 30 are both carried by the disc 17ᵇ which is rigid with the shaft 19 similar to the arrangement shown in Figure 3. It will be clear in this arrangement that all the elements are so interconnected that the said five sets will progressively and relatively rotate, and the operation will be similar to that described with reference to Figure 2, with the exception that the formation of eddies will be minimized and the circular momentum imparted to the liquid will be increased.

Figure 7:
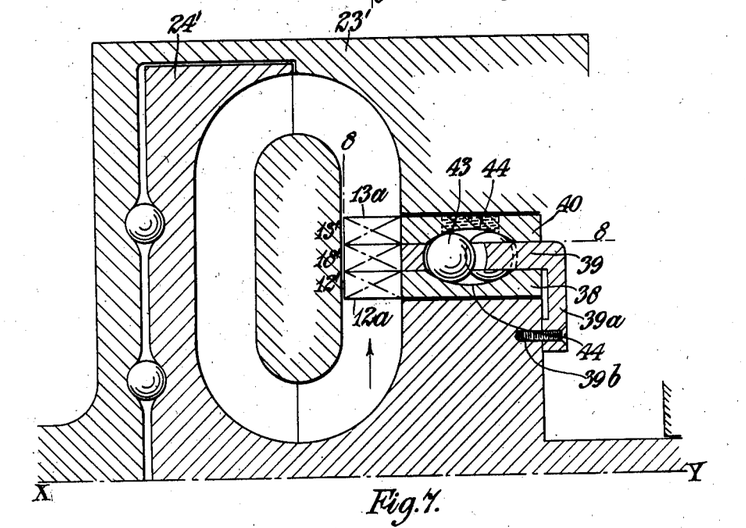
Figure 7 is a longitudinal sectional elevation of a part of a torque converter with a different arrangement of fluid circuit and a different means for operatively connecting the sets of vanes together.

The further embodiment of the invention shown in Figures 7 and 8 is a modification of the construction shown in Figure 4 and is particularly adapted for use in that portion of a liquid circuit where the liquid is not moving parallel to the axis of rotation but at right angles thereto, the sets of vanes 12', 18' and 13' acting upon a circular body of liquid which under centrifugal force has a longitudinal velocity indicated in Figure 7 by an arrow. In this modification the vanes 12ᵃ, 18ᵃ and 13ᵃ are respectively carried by three annular rings 38, 39 and 40 which are arranged so as to be rotatable around the axis x—y of the torque converter, whilst the centre ring 39, which as illustrated is fixed to the driven member 24', may be rotated or be held stationary or against rotation. The drive member is designated at 23'. This centre ring 39 is provided with a plurality of inclined slots 41, 42 which are adapted to form guides for balls 43. Each of the rings 38 and 40 is provided with a race-way such as 44 with which the balls are adapted to coact. The arrangement of the inclined slots 41, 42 is such that assuming that the ring 38 is rotated relatively to the centre ring 39, the balls 43 will be caused to move along the slots until they are wedged between the race-ways 44 of the rings 38 and 40, whereby a rotation of the ring 40 relatively to the centre ring 39 in the opposite direction will be obtained. It will be clearly appreciated that this form of interconnection is an equivalent of the crown wheel and pinion device hereinbefore described. The action of the device is to impress rotation upon the fluid in a similar manner to that described with reference to the previous embodiments. The centre ring of vanes 39 may either be positively driven by the driven member by means of the crank arm 39ᵃ rigidly connected as at 39ᵇ to the driven member, or, may be otherwise driven or may be held stationary or against rotation to produce torque multiplication.

Figure 9 shows an alternative form of connection between the rings 38', 39' and 40' wherein the centre ring 39' carries a plurality of pinions 45 rotatable on pivots 46 secured to the said centre ring. The ring 38' is provided with teeth adapted to engage the pinions 45, whilst in a similar manner the outer ring 40' is also provided with teeth adapted to engage the said pinions. It will be clear that upon rotation of the ring 38', relative to the ring 39', the pinions 45 will transmit motion to the outer ring 40' causing it to rotate in the opposite direction relative to the ring 38'.

I have now described certain preferred embodiments of my invention in which there may be used to control the rotation of the fluid in a power transmission system of the said kind a group of three or more sets of vanes so connected together as to be progressively and relatively rotated, an inner set being either held against rotation or rotated by some source of power. It will be appreciated that one application of my invention would be to make this inner set either:—(a) the driven member of the said power transmission system, in which case this inner set would be connected to the driving wheels of the car and would therefore be held against rotation, because in order to rotate it work has to be done to move the car; or (b) the driving member of the said power transmission system, in which case this inner set would be rotated by the engine.

Figures 13, 14, 15:
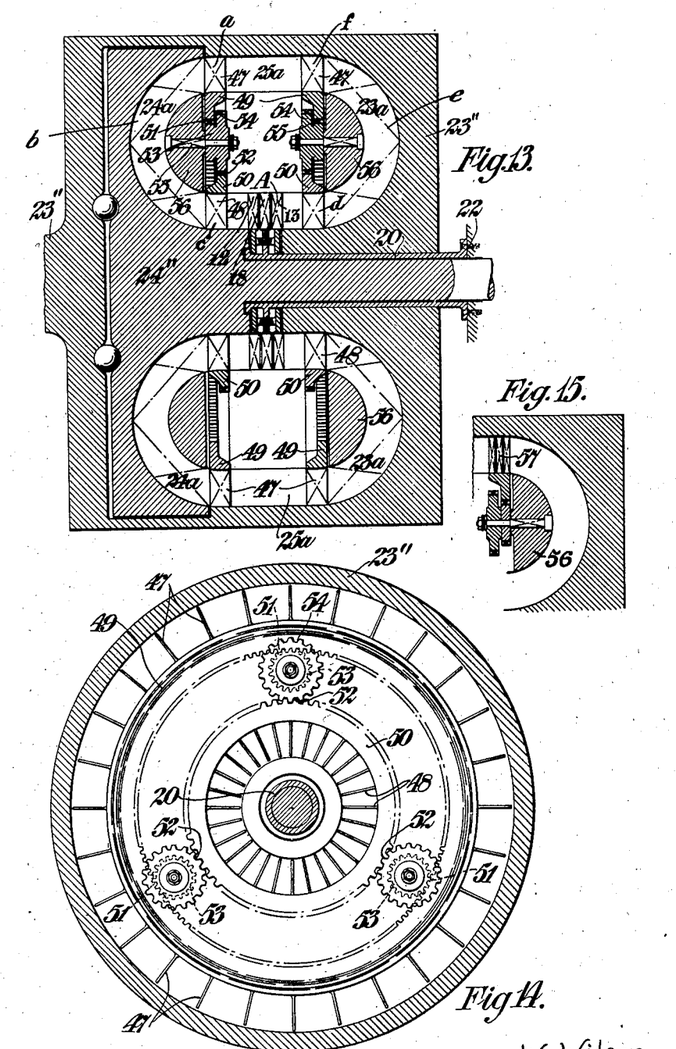
Figure 13 is a longitudinal vertical section of a modified form of the transmission.
Figure 14 is a cross sectional view.
Figure 15 is a fragmentary view of a detail.

Figures 13, 14 and 15 illustrate this application of my invention, both the driving and the driven members respectively being the inner set of vanes of one of two groups of three sets of vanes connected together in manner according to my invention. In addition thereto there is situate in the path of the fluid from the driven member to the driving member the group of sets of vanes A which is similar in construction and function to the group A shown in Figure 4.

The device will now be described in detail with reference to Figures 13 to 15. The transmission system resembles that which has been already described and comprises, as shown in Figure 13, the driving element 23'' and the driven element 24'', the shaft of which passes centrally through the member 23''. The driving member 23'' is fitted with inner and outer annuli as has been described, the outer annulus being indicated at 25ᵃ and the fluid which is thrown out by centrifugal action from the member 23'' is directed by vanes 23ᵃ through the outer annulus 25ᵃ into vanes 24ᵃ arranged in radiating passages formed in the member 24'' and back through the inner annulus to the driving part 23''.

There is provided in the path of the fluid as it moves parallel to the axis along the outer annulus 25ᵃ and also in the path of the fluid as it travels in a similar manner along the inner annulus in the opposite direction a ring of blades each of which is adapted to be moved continuously across the flow of the fluid passing through the inner and outer annuli. The ring of blades for the outer annulus are indicated at 47 and those for the inner annulus are indicated at 48. There are thus two rings both concentric with the general longitudinal axis of the device, the blades 48 acting upon the fluid in the inner annulus whilst those 47 act on the fluid in the outer annulus.

The blades in each ring are mounted or so arranged that they stand edgewise to the fluid and the two sets of blades each constitute a pair of wheels. Thus, the blades 47 are mounted on a wheel 49 whilst the blades 48 are carried by a wheel 50. The wheel 49 is toothed internally as shown at 51 whilst the wheel 50 is toothed externally at 52. These two wheels are so arranged that they respectively engage two corresponding rings of teeth 53 and 54 which are both formed upon a compound pinion adapted to be carried upon a stem 55 which is secured upon a suitable solid part 56 forming part of the driven member 24''. As shown in Figure 14, three compound pinions equally spaced apart are provided to engage the wheels 49 and 50 and it will be understood that in the operation of the device when the driven part is rotating, the compound pinions will orbitally rotate and drive upon the two wheels 49 and 50 respectively and cause such wheels with their sets of teeth to rotate in opposite directions.

It is preferred that these two wheels 49 and 50 shall rotate at different speeds and for this purpose the rings of teeth 53 and 54 on the compound pinions are of different diameter, whereby the wheel 48 will rotate at a speed somewhat higher than the wheel 49 or the arrangement may be reversed, that is to say, the wheel 49 may rotate slower than the wheel 50, depending upon circumstances.

As has been described the compound pinions are in engagement respectively with the inner and outer wheels 49 and 50 and as the parts are maintained in rotation, it will be understood that the compound pinions will receive not only an orbital rotation, but they will also receive rotation around their axes. By means of this self rotation, the blade wheels associated with their respective pinions will receive a movement relatively to one another but each partaking of a rotation in one direction so that one wheel will be receiving an accelerated rotation whilst the other will be receiving a retarded rotation.

Assuming that the outer ring of blades 47 is receiving an accelerated rotation in reference to the driven member 24", as the successive blades move across the outer annulus 25ª they will tend to check the flow of fluid in a circular direction which is passing along such outer annulus.

In this connection it will be pointed out that the movement of the circulating fluid may be said to commence with the driving half 23" of the device where it is subjected to centrifugal action so that the fluid is discharged at increased speed to pass along the outer annulus 25ª. The fluid is then received by the driven set of radial passages 24ª in the driven member 24" and issuing from these, it tends to return towards the driving end. The fluid after having been In this way, the fluid circuit which is maintained by the fluid transmission described may be controlled at four points in the manner referred to whereby the circular speed of the fluid will be controlled at these points so as to give the best results.

The form of the blades 47 and 48 may be such that they will stand edgewise to the fluid and be left flat or curved or they may be arranged in annular relation to the fluid flow so as to produce any resultant force desired, whether it is to serve as a retarding influence to the flow of the fluid in the annulus associated therewith or to facilitate the flow in the annulus. The blades may be either flat or curved, symmetrical or unsymmetrical and if desired each ring of blades may be supplemented by one or more other rings somewhat after the manner shown in Figure 15 where one of the blades 47 is shown as being split or divided up into three portions 57 and again these three rings may be so constructed that they will form a balance gear such as that illustrated at A in Figure 13.

The arrangement shown has many advantages. Consider the fluid approaching the driven member with a strong positive rotation impressed thereon by the driving member. This fluid will strike the set of vanes $a$ and will cause it to rotate positively, at the same time being deflected thereby negatively. As the set of vanes $a$ will be rotating positively the entrant angle for the fluid into the said set of vanes will be sloped more in a positive direction consequent upon this rotation than would be the case if the vanes were not rotated. For this reason the inter-position of the set of vanes $a$ diminishes eddy at the point where the impinging fluid first begins to give up its rotation to the driven member. The fluid for the fluid into the set of vanes $d$ being sloped negatively compared with the angle which would have been presented to the fluid if the set of vanes $d$ was not present. On the fluid passing from the driving member $e$ to the set of vanes $f$, the positive rotation of the fluid is again increased because $f$ is rotated positively by the set of vanes $d$ at a speed greater than that of the driving member, with the result that the efficiency of the system and the torque transmitted to the fluid is increased. As the torque transmitted to the fluid by the driving member and the sets of vanes which it carries is increased so will the torque transmitted to the driven member be increased. Thus from this particular application of my invention there will be obtained an increase both in the torque transmitted and in the efficiency of working of the transmission system.

I claim:

1. A hydraulic torque converter comprising in combination driving and driven members rotatable in the same direction about a central axis common to both and a fluid circulating between the two so that the rotary driving member may transmit a drive to the driven member, the combination of an outer annulus for the flow of fluid from the driving to the driven members, an inner annulus for the return of fluid from the driven to the driving members, a vaned wheel concentric with the central axis with its vanes immersed in the fluid passing from the outer annulus into the driven member, a second vaned wheel also concentric with the central axis and having its vanes immersed in the fluid as it leaves the driven member to pass along the inner annulus, means for rotating the vaned wheels in opposite directions and a reaction member interposed in the path of the fluid passing along the inner annulus.

2. A hydraulic torque converter comprising in combination driving and driven members rotatable in the same direction about a central axis common to both and a fluid circulating between the two so that the rotary driving member may transmit a drive to the driven member, the combination of an outer annulus for the flow of fluid from the driving to the driven members, an inner annulus for the return of fluid from the driven to the driving members, a vaned wheel concentric with the central axis with its vanes immersed in the fluid as it leaves the driving member to pass into the outer annulus, a second vaned wheel also concentric with the central axis, and having its vanes immersed in the fluid as it leaves the inner annulus to pass into the driving member, means for rotating the vaned wheels in opposite directions and a reaction member interposed in the path of the fluid passing along the inner annulus.

3. A hydraulic transmission comprising a rotary driving member and a rotary driven member mounted upon the same central axis, an open sided annular recess in both the driving and driven members, facing one another with their open sides closely adjacent one another, fluid circulating through said annular recesses so that the driving member may impart a drive to the driven member, and a vaned wheel system interposed in the annular recess in the driving member, said vaned wheel system including two sets of rotary vanes arranged in series in the path of the fluid and immersed therein, an operative connection for the sets of vanes so that the movement of the fluid past one set and causing such set to rotate in one direction, will cause the other set to rotate in the opposite direction, a member arranged between the two sets of vanes and carrying such operative connection, a third set of rotary vanes carried by such member, so as to be positioned between the two sets of vanes, and means for rotating such third set of vanes.

4. A hydraulic transmission comprising a rotary driving member and a rotary driven member mounted upon the same central axis, an open sided annular recesss in both the driving and driven members, facing one another with their open sides closely adjacent one another, fluid circulating through said annular recesses so that the driving member may impart a drive to the driven member, and a vaned wheel system interposed in the annular recess in the driving member, said vaned wheel system including two sets of rotary vanes arranged in series in the path of the fluid and immersed therein, an operative connection for the sets of vanes so that the movement of the fluid past one set and causing such set to rotate in one direction, will cause the other set to rotate in the opposite direction, a member arranged between the two sets of vanes and carrying such operative connection, a third set of rotary vanes carried by such member so as to be positioned between the two sets of vanes and means for holding stationary such third set of vanes.

5. Hydraulic torque converter comprising in combination a driving and a driven member both carrying centre shafts in mutual alignment, radial vaned passages formed in both such members, the vaned passages of one member facing those of the other member and being placed in communication at their open ends by an inner and an outer annulus respectively, two sets of vanes concentric with the central axis and both arranged to operate in the circulating fluid passing along the inner annulus, toothed differential mechanism connecting the two sets of vanes so that when the moving fluid causes one set of vanes to rotate in one direction, the other vanes will be turned in the opposite direction, a third set of vanes mounted in the annulus between the other two sets, a sleeve concentric with the shaft of the driven member and means for holding stationary such sleeve and third set of vanes.

6. A hydraulic transmission comprising driving and driven members having vanes, a fluid circulating between said members and a fluid return passage between said members, sets of rotary vanes in said passage, and means operatively connecting the sets of vanes together whereby the movement of the fluid past one set of vanes rotates the latter in one direction and causing another set to rotate in the opposite direction to impart rotation to the fluid.

7. A hydraulic transmission comprising driving and driven members having vanes, a fluid circulating between said members and a fluid return passage between said members, sets of rotary vanes in said passage, means operatively connecting the sets of vanes together whereby the movement of the fluid past one set of vanes rotates the latter in one direction and causing another set to rotate in the opposite direction, and a stationary member supporting said connecting means.

8. A hydraulic transmission comprising driving and driven members having vanes, a fluid circulating between said members and a fluid return passage between said members, a shaft disposed longitudinally of said passage, sets of vanes mounted in series along the shaft, means operatively connecting the sets of vanes together whereby when one set of vanes is set in motion by the passage of said fluid in one direction, another set of said vanes is caused to rotate in the opposite direction.

9. A hydraulic transmission comprising driving and driven members having vanes, a fluid circulating between said members and a fluid return passage between said members, two sets of rotary vanes arranged in series in said passage, an operative connection between said sets of vanes adapted when one of said sets is set in motion by said fluid in one direction, to cause rotation of the other set in the opposite direction, a member arranged between said sets of vanes and carrying said operative connection, and a third set of vanes carried by said member positioned between said two sets of vanes, and means for rotating said third set of vanes.

10. A hydraulic transmission comprising driving and driven members having vanes, a fluid circulating between said members and a fluid return passage between said members, two sets of rotary vanes arranged in series in said passage, an operative connection between said sets of vanes adapted when one of said sets is set in motion by said fluid in one direction, to cause rotation of the other set in the opposite direction, a member arranged between said sets of vanes and carrying said operative connection, and a third set of vanes carried by said member positioned between said two sets of vanes, and means to hold the third set of vanes stationary.

11. A hydraulic transmission comprising driving and driven members, an outer annulus for the flow of fluid from the driving to the driven members, an inner annulus for the return of said fluid from the driven to the driving member, sets of rotary vanes located in the inner annulus, and means operatively connecting the sets of vanes together whereby the movement of one set of vanes produced by the movement of said fluid in one direction causes the other set of vanes to rotate in the opposite direction.

12. A hydraulic transmission comprising driving and driven members, an outer annulus for the flow of fluid from the driving to the driven members, an inner annulus for the return of said fluid from the driven to the driving member, sets of rotary vanes located in the inner annulus, means operatively connecting the sets of vanes together whereby the movement of one set of vanes produced by the movement of said fluid in one direction causes the other set of vanes to rotate in the opposite direction, a member arranged between the first mentioned sets of vanes and carrying said operative connection, a third set of vanes carried by said member and positioned between the first mentioned sets of vanes, and means for holding the third set of vanes stationary whereby the third set of vanes constitute a reaction member for the fluid.

13. A hydraulic transmission comprising driving and driven members, an outer annulus for flow of fluid from the driving to the driven members, an inner annulus for the return of said fluid from the driven to the driving member, means for rotating the fluid leaving the driven member in a direction opposite to that of the driven member in passing along the inner annulus, and a reaction member in said inner annulus, said reaction member including sets of rotary vanes, and means operatively connecting the sets of vanes together whereby the movement of the fluid acting on one set of vanes revolves the latter in one direction, causing another set to rotate in the opposite direction to impart rotation to the fluid in the same direction as that of the driving member.

14. A hydraulic transmission as claimed in claim 1 characterized in that said reaction member includes sets of rotary vanes, and means operatively connecting the sets of vanes together whereby when one set of vanes is set in motion by the passage of the fluid in one direction, another set of vanes is caused to rotate in the opposite direction.

15. A hydraulic transmission comprising driving and driven members, having vanes and rotatable in the same direction about a common central axis, an outer annulus and an inner annulus containing fluid circulating between said members, a vaned wheel at the end of the outer annulus concentric with said axis and having the vanes thereof immersed in said fluid, an additional vaned wheel arranged at the end of the inner annulus and having the vanes thereof immersed in the fluid passing therethrough, means operatively connecting said vaned wheels for imparting rotary movement of one wheel to the other wheel, said vaned wheels being arranged adjacent one of said members for controlling the circular speed of the fluid entering and leaving said member, and a reaction member interposed in the path of the fluid passing along the inner annulus.

16. A hydraulic transmission comprising driving and driven members having vanes, a fluid circulating between said members and a fluid return passage between said members, sets of curved rotary vanes in said passage, and means operatively connecting the sets of vanes together whereby the movement imparted to one set of vanes by the passage of the fluid in one direction causes another set of vanes to rotate with a minimum amount of eddy, in the opposite direction.

17. A hydraulic transmission as claimed in claim 11 characterized in that the vanes of said sets are curved.

18. A hydraulic transmission comprising driving and driven members having vanes, a fluid circulating between said members and a fluid return passage between said members, a reaction device arranged in said passage, said reaction device including sets of rotary vanes, toothed gear rings on the sets of vanes mutually facing each other, a central pinion meshing with said toothed rings, a central shaft, and means on said shaft carrying said pinion, the movement of the fluid imparting rotation to one set of vanes and causing another set of vanes to impart rotation to the fluid.

19. A hydraulic transmission comprising driving and driven members having vanes, a fluid circulating between said members and a fluid return passage between said members, a central shaft, and a plurality of sets of vanes interposed in said passage and rotatable about said shaft, and means operatively connecting the sets of vanes together whereby movement of one set of vanes effected by the passage of the fluid thereover causes rotation of another set of vanes in the opposite direction.

20. A hydraulic transmission comprising driving and driven members having vanes, a fluid circulating between said members and a fluid return passage between said members, a vaned wheel having the vanes thereof immersed in the fluid as it leaves the driven member, and a reaction member interposed in said passage between said vaned wheel and said driving member, said reaction member including sets of vanes operatively connected for rotation in opposite directions.

21. A hydraulic transmission comprising driving and driven members having vanes, a fluid circulating between said members and a fluid return passage between said members, a vaned wheel having its vanes immersed in the fluid as it passes into the driving member, and a reaction member interposed between the driven member and said vaned wheel, said reaction member including sets of vanes operatively connected for rotation in opposite directions.

22. A hydraulic transmission as claimed in claim 15, characterized in that said means operatively connecting the wheels is constituted by a differential gear element, whereby the vaned wheels are rotated at different speeds.

WALTER GORDON WILSON.